Figure 1:
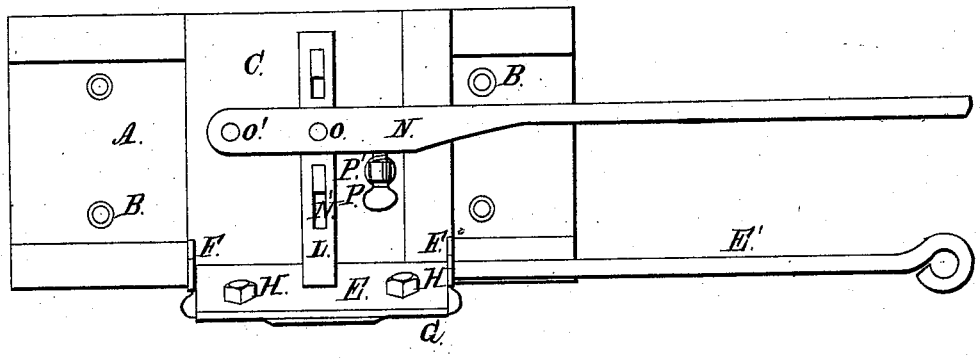

J. Weichhart.
Sharpening Machine.
No. 95,761. Patented Oct. 12, 1869.

Witnesses.
David R. Smith
Philo Doud

Inventor.
John Weichhart
By his Atty
C. W. M. Smith

United States Patent Office.

JOHN WEICHHART, OF SAN FRANCISCO, CALIFORNIA.

Letters Patent No. 95,751, dated October 12, 1869.

IMPROVEMENT IN MACHINES FOR GRINDING HARVESTER-CUTTERS.

The Schedule referred to in these Letters Patent and making part of the same.

*To all whom it may concern:*

Be it known that I, JOHN WEICHHART, of the city and county of San Francisco, State of California, have invented an Improved Implement for Holding Knives to Reapers and Mowers and other Straight-Edged Tools during the Process of Grinding; and I do hereby declare that the following description and accompanying drawings are sufficient to enable any person skilled in the art or science to which it most nearly appertains, to make and use my said implement without further invention or experiment.

The nature of my invention is to provide a holder for knives and sickles to reapers and mowers and other straight-edged tools, so that a uniform and true bevel to the edge may be imparted, without injury to grindstones, or accident to the operator or grinder, and is intended to be used principally by manufacturers, although the implement may be used by farmers, when the knives are removed from the sickle-bar.

Referring to the drawings accompanying this specification—

Figure 2:
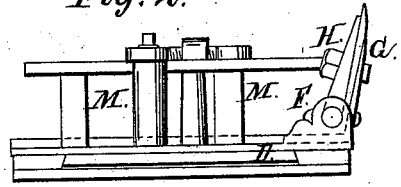
Figure 3:
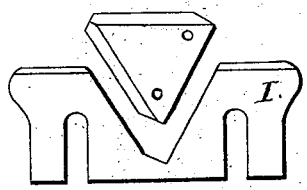

Figure 1 is a plan of the machine.
Figure 2 is an end view of the same.
Figure 3 is a view of the knife-holder and knife.

The plate A is attached to a block by screws or otherwise, through countersunk openings, B B, for that purpose, and the block may rest on the frame of the grindstone, or other support.

A plate, C, holds the principal parts of the mechanism, and slides along the base-plate in ways, D D, so that all parts of the surface of the stone may be reached for a true and equal wearing.

The upper end of the plate is provided with the tool-holder, which consists of a leaf or jaw, E, rigidly attached to the arm or rod E', which, in turn, is connected to the plate C by ears, F F, allowing it to move back and forth on the axis.

A plate or leaf, G, with top edge bevelled, is placed in front of the stationary plate, and the two form jaws, or a clamp, to hold the gauge that contains the knife or tool. This device is regulated by the set-screws H H, which the gauge straddles.

The gauge I is formed for a reaper or mower-knife. A piece is cut from it to correspond with the shape of the knife, when inserted properly, and maintains the cutting-edges on a horizontal plane with the jaws, which is accomplished by changing the triangular-shaped sickle or knife from side to side, when the set-screws may be turned to hold it tightly between the jaws.

A slot or opening is made in the set-plate to allow the grit or sand from the stone to pass through.

In order to maintain the desired bevel to the edge of the instrument, I employ a slotted bar, L, with slightly rounded or bevelled end, which moves against the back of the plate or jaw E on the posts M M.

The slotted bar is operated by a lever, N, upon the pin *o* and post *o'*, the reach being regulated by a set-screw, P, passing through the post P'.

The further operation of the implement will readily suggest itself to an experienced grinder, and much time will be saved and better work performed by its use, than where the ordinary methods, or tongs, are employed as holders for edged tools during the process of grinding.

Having thus described my implement or tool-holder,

What I claim, and desire to secure by Letters Patent, is—

The clamp or holder, consisting of the plates E and G, and set-screws H, in combination with the gauge I, slotted bar L, lever N, set-screw P, and movable plate C, substantially as set forth.

In witness whereof, I have hereunto set my hand and seal.

JOHN WEICHHART. [L. S.]

Witnesses:
C. W. M. SMITH,
H. S. TIBBEY.